J. J. BOUCHER.
SHAFT PACKING.
APPLICATION FILED AUG. 30, 1909.
973,850.
Patented Oct. 25, 1910.
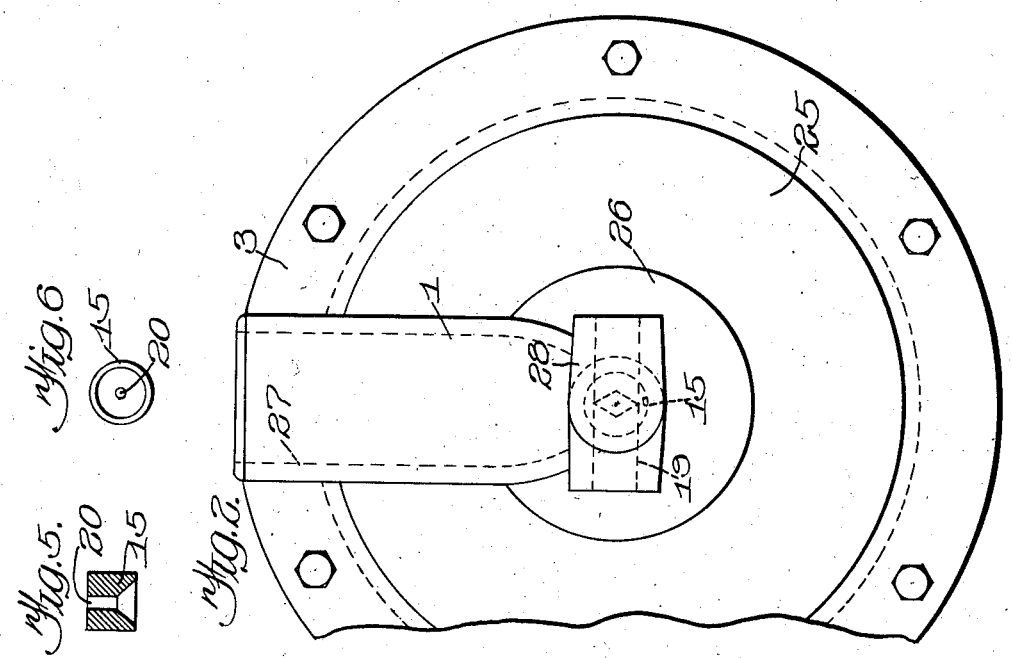
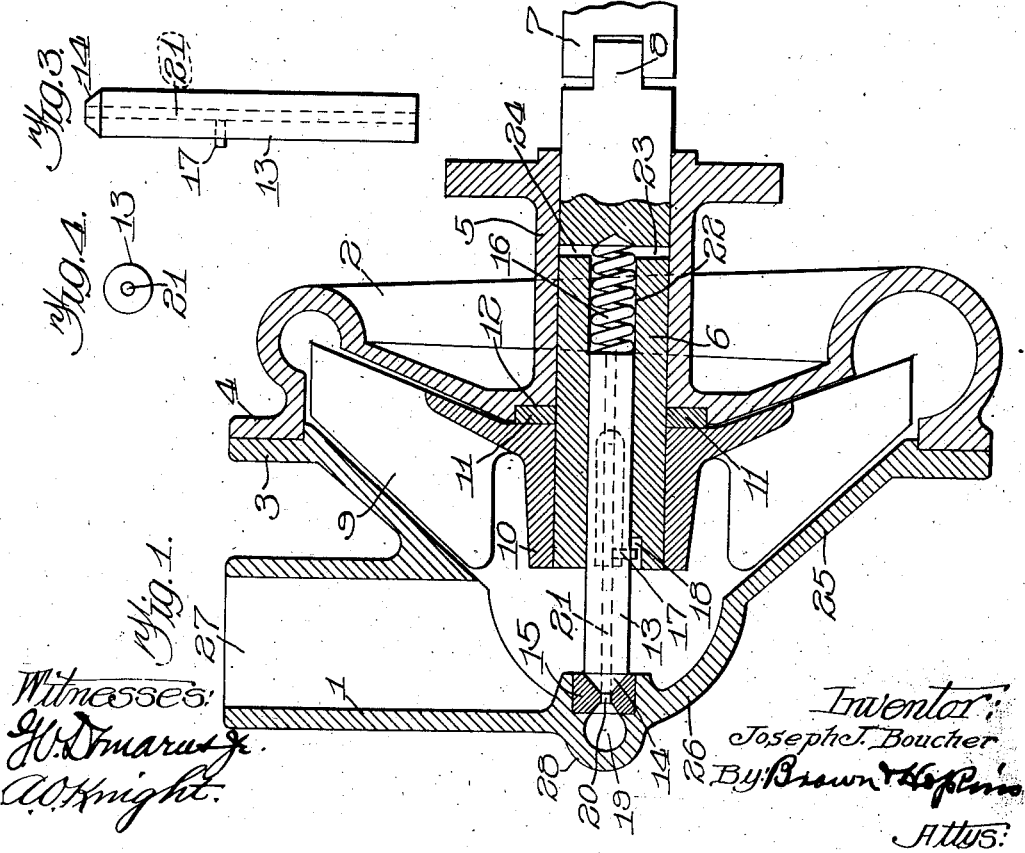
Witnesses:
H. D. Marsh Jr.
A. O. Knight.
Inventor:
Joseph J. Boucher
By Brown & Hopkins
Attys.

UNITED STATES PATENT OFFICE.

JOSEPH J. BOUCHER, OF HARVEY, ILLINOIS, ASSIGNOR TO STERLING VEHICLE COMPANY, OF HARVEY, ILLINOIS, A CORPORATION OF NEW JERSEY.

SHAFT-PACKING.

973,850. Specification of Letters Patent. Patented Oct. 25, 1910.

Application filed August 30, 1909. Serial No. 515,203.

*To all whom it may concern:*

Be it known that I, JOSEPH J. BOUCHER, a citizen of the United States, residing at Harvey, in the county of Cook and State of Illinois, have invented certain new and useful Improvements in Shaft-Packings, of which the following is a specification.

This invention relates to means for packing shafts which are rotatably mounted in fluid-containing chambers.

One of the objects of this invention is to provide improved means of simple and efficient construction for packing the bearings of rotating shafts.

Another object is to provide an improved packing device which will automatically increase the tightness of the packed joint when the pressure of the fluid in the fluid-containing chamber is augmented.

A more particular object is to provide an improved packing device according to which the shafts of rotary pumps and similar machines will be made automatically adjustable in an axial direction and in which the rotor will be brought to bear with a resilient pressure upon packing material interposed between said rotor and the wall of the housing.

Still another object is to provide improved means for lubricating the packed bearings of rotary machines.

With these and other objects in view that will appear in the following specification, my invention is exemplified in its application to a rotary pump as shown in the drawings attached hereto and forming a part of this specification.

In the drawings—Figure 1 is a longitudinal section of a pump embodying my invention. Fig. 2 is a side elevation of the pump as seen from the left according to Fig. 1. Fig. 3 is a detail elevation of the resiliently mounted spindle which is automatically adjustable longitudinally relatively to the shaft of the rotor. Fig. 4 is an end view of the spindle shown in Fig. 3. Fig. 5 is a detail section of the thrust bearing for supporting one end of the spindle shown in Fig. 3. Fig. 6 is an end view of the thrust bearing.

As an exemplification of suitable means for mounting a rotor resiliently and axially adjustable within its housing, one wall of said housing has an ordinary cylindrical bearing mounted therein while the opposite wall carries an end thrust bearing, said bearings serving to support a rotor shaft of peculiar construction illustrated in the drawings, the housing comprising an inlet section 1 and an outlet section 2, said sections being fastened together along peripheral flanges 3 and 4. Within the wall of one section of said housing, preferably within the outlet section 2, is provided a bearing block or member 5 which projects outwardly from the wall of said housing and serves to rotatably support a rotor shaft 6 which is connected up in driven relation with an engine shaft 7 by means of a suitable clutch 8 which permits a relative axial adjustment between said shafts while they are being rotated. Keyed to the inner end of the rotor shaft 6 is a rotor head 9, which is provided with a hub portion 10. Packing means of any suitable material may be interposed at any suitable point between the thrust bearing surface of the hub and the inner wall of the housing contiguous thereto, but preferably a packing member 11 of such material as lignum vitæ or fiber is housed within a recess 12 formed about the inner end of the bearing member 5 and extending entirely around the shaft. Said packing member 11 as shown is made in the form of a washer fitting the rotor shaft 6, and is of such thickness as to hold the hub 10 of the rotor spaced from the inner wall of the housing so that when said hub is forced resiliently against the packing 11 by means of the parts and connections to be hereinafter described, the rotor head 9 assumes a suitable position for rotating freely within its housing. Any suitable means may be employed for exerting a resilient pressure upon the packing for securing a fluid tight joint, the means employed in the present exemplification comprising an axially movable spindle 13 provided on one end with a conical journal 14 rotatably seated in an end thrust bearing block 15, which may be mounted in the inner wall of section 1 of the housing. The rotor shaft 6 is provided with a central hollow extending throughout the greater portion of its length, and of the same cross-sectional shape as the spindle 13 to permit said spindle to be slidably mounted therein for the purpose of providing an axial adjustment between the shaft 6 and spindle 13, which thus constitute an axially-extensible rotor shaft. In order to maintain the end of spindle 13 in position in its bearing, and to provide a suitable means for forcing the hub of the rotor resiliently against the packing 11, a resilient member 16, preferably in the form of a spring, is housed within the hollowed interior of the shaft 6 between said shaft and the inner end of the hollowed passage. There is thus created a resilient pressure which tends to force the shaft 6 outwardly through the bearing block 5 which causes the hub 10 to press against the washer 11 and maintains a fluid-tight joint between the interior of the fluid chamber and the shaft bearing. In order to prevent an undesirable wear between the spring 16 and the inner end of the spindle 13, some suitable means must be provided for preventing a rotation of the spindle 13 in the shaft 6, while at the same time permitting an axial adjustment of said spindle. As preferable means for securing this result, the spindle 13 has rigidly mounted thereon a radially projecting pin 17 slidably engaging in a suitable slot 18 in the inner surface of the hub portion and adjacent to the end surface thereof.

Referring more especially to Fig. 1 of the drawings, the lubricating means will now be described. Within the wall of the section 1 of the housing and preferably adjacent to the bearing block 15, is provided an oil well or cavity 19 which is kept supplied with lubricant by means to be referred to presently. This cavity 19 is in open communication with a channel 20 in the bearing block 15, said channel being in register with a longitudinal channel 21 formed in the rotor shaft 6. The channel 21 empties into the spring-housing cavity 22 already referred to, while within the shaft 6 and extending radially outward to the bearing surface of the block 5 are arranged channels 23 and 24 which convey the lubricant outwardly during the operation of the pump to lubricate the entire bearing surface of the shaft 6.

Detached detail views of the spindle 13 and bearing block 15 are shown in Figs. 3, 4, 5 and 6 of the drawings.

Referring now to Fig. 2 of the drawings, the inlet section 1 of the rotor housing embodies a conical wall 25 which terminates laterally in a dome-like portion 26 of approximately semi-spherical conformation. Projecting radially from this dome-like portion 26 is an inlet pipe 27 adjacent to the inner end of which the end-thrust bearing block 15 is mounted in the inner wall of the dome 26. The dome 26 is provided exteriorly with a protuberance 28 of substantially similar shape to a pipe fitting coupling. As shown in Fig. 2, this protuberance is preferably formed integrally with the wall of the housing and may be cast as a double-ended blank coupling by means of which connection can be made with the lubricant-holding well 19 through either end of said blank 28.

What I claim is:

1. The combination with a fluid chamber provided with a bearing, a member movable in said bearing, said member being made in sections movable relatively to each other, and means interposed between the sections of said member for creating a resilient pressure between the sections of said member.

2. The combination with a fluid chamber provided with a bearing, packing means for said bearing, a member movable in said bearing relatively to said packing means, said member being made in two sections movable relatively to each other, and means interposed between the sections of said member for generating a resilient pressure between the member and the packing.

3. The combination with a fluid containing chamber provided with a bearing, of a rotor shaft mounted in said bearing and provided with a rotor head within said chamber, said shaft being movable axially to enable the rotor head to be pressed against a portion of the inner wall of the chamber contiguous to said bearing, and means interposed between said shaft and another portion of the inner wall of the chamber for exerting a resilient pressure on said rotor head toward said bearing.

4. The combination with a fluid chamber provided with a bearing, of a rotor shaft mounted in said bearing and provided with a cylindrical recess in the end thereof, a rotor head, means extending around the rotor shaft and interposed between the rotor head and the inner wall of the chamber for packing said bearing, a spindle reciprocably mounted in said recess, and resilient means interposed in said recess between said shaft and spindle whereby the spindle is forced resiliently against the inner wall of the chamber to press the rotor against said packing means.

5. In a rotary machine, the combination of rotor and housing members, said members being axially adjustable relatively to each other, and said rotor comprising a telescoping sectional shaft, and means for resiliently forcing the sections of said shaft apart to press said rotor and housing members together.

6. In a rotary machine, the combination with a housing provided with a bearing, of a sectional rotor mounted in said bearing, the sections of said rotor being adjustable axially, and means disposed between said sections for pressing said rotor against the bearing.

7. In a rotary machine, the combination with a housing provided with a bearing extending through the wall thereof, of a rotor embodying a rotor-head adjustable axially in said bearing, means interposed between said rotor head and one wall of the housing for effecting a fluid-tight joint between the interior of the housing and the inner end of said bearing, and resilient means interposed between the rotor and an inner wall of the housing for forcing the rotor against the packing means.

8. In a rotary machine, the combination of a housing provided with a bearing, said bearing being recessed around its inner end, packing material mounted in said recess, and projecting beyond the surface of the contiguous portion of the housing wall, a rotor adjustable axially in said bearing, and means for resiliently pressing the rotor against the packing material.

9. In a rotary machine, the combination with a housing provided with oppositely disposed bearings, of bearing packing means, a rotor mounted in said bearings and provided with a shaft capable of being elongated axially, a rotor head pressed against said packing by the axial elongation of said shaft, and means for resiliently elongating said rotor shaft.

10. In a rotary machine, the combination with a housing provided with a bearing, of a rotor mounted in said bearing, said housing and rotor being adapted to be pressed resiliently together along their common axis, and packing means for said bearing interposed between said rotor and housing.

11. In a rotary machine, the combination with a housing provided with oppositely disposed bearings, of a rotor provided with a shaft mounted in said bearings, said shaft being made of hollowed sections slidably engaging each other, said sections being adapted to convey a lubricant for said bearings, means for introducing a lubricant to said hollowed shaft, and means interposed between said sections in the hollow of one of said sections for resiliently forcing said sections apart.

12. In a rotary machine, the combination with a housing provided with oppositely disposed bearings, of a rotor shaft comprising a plurality of interiorly hollowed sections slidable axially relatively to each other, said shafts being adapted to convey a lubricant from one bearing to the other by means of said hollows, and resilient means disposed between said sections to force them resiliently against said bearings.

13. In a rotary machine, the combination with a housing provided with oppositely disposed bearings, of a rotor shaft mounted in said bearings, said shaft comprising telescoping sections and resilient means between said sections whereby a tendency to elongate is imparted to said shaft.

14. In a rotary machine, the combination with a housing provided with a bearing, the inner wall of said housing being provided with a recess adjacent to the bearing, a sectional rotor supported by said bearing, packing means mounted in said recess, and means disposed between the sections of said rotor whereby said rotor is adapted to exert a resilient pressure on said packing means.

15. In a rotary machine, the combination with a housing provided with a bearing and a rotor, said bearing and sectional rotor having adjacently disposed portions, of packing means disposed between said portions, and means disposed between the sections of said rotor for resiliently pressing said portions together.

16. In a rotary machine, the combination with a housing provided with a bearing block rigid therewith, of a rotor rotatably mounted in said bearing block, said rotor and block having adjacently disposed portions, packing means interposed between said portions, and means for resiliently pressing said portions together, said means comprising a resilient device interposed between the rotor and housing.

17. In a rotary machine, the combination with a housing provided with a bearing block rigid therewith, of a rotor rotatably mounted in said bearing block, said rotor and block having adjacently disposed portions, packing means interposed between said portions, and means for resiliently pressing said portions together said means comprising a spindle resiliently mounted between the rotor and the wall of the housing.

18. In a rotary machine, the combination with a housing provided with a bearing block rigid therewith, of a rotor rotatably mounted in said bearing block, said rotor and block having adjacently disposed portions, packing means interposed between said portions, and means for resiliently pressing said portions together, said means comprising a spindle slidably engaging the rotor shaft and bearing on the wall of the housing, and resilient means interposed between the shaft and spindle.

19. In a rotary machine, the combination with a housing provided with a bearing block rigid therewith, of a rotor rotatably mounted in said bearing block, said rotor and block having adjacently disposed portions, packing means interposed between said portions, and means for resiliently pressing said portions together, said means comprising a bearing on the inner wall of the housing and a spindle resiliently engaging said rotor and seated in said inner wall bearing.

20. In a rotary machine, the combination with a housing provided with a bearing block rigid therewith, of a rotor rotatably mounted in said bearing block, said rotor and block having adjacently disposed portions, packing means interposed between said portions, and means for resiliently pressing said portions together, said means comprising an end thrust bearing block removably seated within the inner wall of said housing and a spindle resiliently and slidably engaging the rotor shaft and turning in said end thrust bearing block.

21. In a rotary machine, the combination with a housing provided with oppositely disposed bearings, of a rotor mounted in said bearings, said rotor comprising an extensible shaft, packing means for one of said bearings, and means for resiliently extending said shaft to press the rotor against the packing means.

22. In a rotary machine, the combination with a housing provided with oppositely disposed bearings, one of said bearings being an end thrust bearing, of a rotor packing means for the other of said bearings, a rotor shaft comprising telescoping portions, one of said portions being rotatably seated in the end thrust bearing, and resilient means interposed between said telescoping portions whereby the rotor is pressed against the packing means for said other bearing.

In testimony whereof I have signed my name to this specification, in the presence of two subscribing witnesses, on this 4th day of Aug. A. D. 1909.

JOSEPH J. BOUCHER.

Witnesses:
M. W. CANTWELL,
A. O. KNIGHT.